US010402838B2

(12) United States Patent
Torgerson et al.

(10) Patent No.: US 10,402,838 B2
(45) Date of Patent: Sep. 3, 2019

(54) MULTIVARIABLE REGRESSION ANALYSIS

(71) Applicant: MEE—Multidimensional Economic Evaluators Inc., Santa Clarita, CA (US)

(72) Inventors: Shad Torgerson, Turtle Lake, WI (US); Kent Joris, Phelan, CA (US); Doug Howarth, Santa Clarita, CA (US)

(73) Assignee: MEE—MULTIDIMENSIONAL ECONOMIC EVALUATORS, INC., Santa Clarita, CA (US)

( * ) Notice: Subject to any disclaimer, the term of this patent is extended or adjusted under 35 U.S.C. 154(b) by 0 days.

(21) Appl. No.: 15/895,840

(22) Filed: Feb. 13, 2018

(65) Prior Publication Data
US 2018/0174166 A1     Jun. 21, 2018

Related U.S. Application Data

(62) Division of application No. 14/303,192, filed on Jun. 12, 2014, now abandoned.

(60) Provisional application No. 61/834,374, filed on Jun. 12, 2013.

(51) Int. Cl.
*G06Q 30/02* (2012.01)

(52) U.S. Cl.
CPC ..... *G06Q 30/0202* (2013.01); *G06Q 30/0201* (2013.01)

(58) Field of Classification Search
CPC .......... G06Q 30/0201; G06Q 30/0202; G06Q 30/0203; G06Q 30/0204; G06Q 30/0205; G06Q 30/0206

USPC .......... 705/7.29, 7.31, 7.32, 7.33, 7.34, 7.35
See application file for complete search history.

(56) References Cited

U.S. PATENT DOCUMENTS

| 5,652,713 | A | 7/1997 | Chandler |
| 7,003,490 | B1 | 2/2006 | Keyes |
| 7,610,169 | B2 | 10/2009 | Washizawa |
| 8,346,682 | B2 | 1/2013 | Steed et al. |
| 2003/0055812 | A1* | 3/2003 | Williams .......... G06F 17/30994 |
| 2004/0019516 | A1 | 1/2004 | Puskorius |
| 2004/0148045 | A1 | 7/2004 | Arnaud |

(Continued)

OTHER PUBLICATIONS

Constructing a Histogram, Preston, SUNY Oswego, available at http://www.oswego.edu/~srp/stats/hist_con.htm (captured, Feb. 23, 2011), (Year: 2011).*

(Continued)

*Primary Examiner* — Charles Guiliano
(74) *Attorney, Agent, or Firm* — SoCal IP Law Group LLP; Angelo Gaz; Steven C. Sereboff

(57) ABSTRACT

There is disclosed apparatuses and methods for performing stepwise regression analysis on industry data. These apparatuses include a processor and memory which comprise circuits and software for performing the instructions on a storage medium comprising accessing a set of data specific to a business environment wherein the set of data comprises a set of values for a set of variables that describe a business environment; receiving a selection of a first variable from the set of variables; generating a correlation table, wherein the correlation table is generated by determining a correlation between the first variable and each remaining variable in the set of variables; and rank-ordering each of the remaining variables in the set of variables based on the correlation; and displaying the correlation table.

20 Claims, 12 Drawing Sheets

(56) References Cited

U.S. PATENT DOCUMENTS

| | | | |
|---|---|---|---|
| 2006/0111963 A1* | 5/2006 | Li | G06Q 10/04 705/7.31 |
| 2007/0078790 A1* | 4/2007 | Kalyan | G06Q 10/02 705/80 |
| 2007/0299743 A1 | 12/2007 | Staib | |
| 2010/0191678 A1 | 7/2010 | Steed | |
| 2010/0204967 A1 | 8/2010 | Mun | |
| 2011/0022525 A1 | 1/2011 | Swinson | |
| 2011/0047004 A1 | 2/2011 | Bateni | |
| 2011/0187711 A1* | 8/2011 | Giovinazzi | G06T 17/00 345/419 |
| 2014/0180768 A1 | 6/2014 | Hack | |

OTHER PUBLICATIONS

White, et al., On Estimating the Exponent of Power-Law Frequency Distributions, Utah State University (2008) (Year: 2008).*
Douglas Howarth of Lockheed Martin Aeronautics, Profit as an Independent Variable: The Case of Business Aircraft. 2011.

* cited by examiner

© 2014 MEE Evaluators

MULTIVARIABLE REGRESSION ANALYSIS

RELATED APPLICATION INFORMATION

This application is a divisional of U.S. patent application Ser. No. 14/303,192 filed on Jun. 12, 2014 which claims priority from the following provisional patent application: U.S. application Ser. No. 61/834,374, titled, "Multivariable Regression Analysis" and filed on Jun. 12, 2013.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to multivariate regression analysis.

Description of the Related Art

In every business industry, it is important for companies to understand what features add value to a product. For example, in the aircraft industry, features such as speed of the aircraft, the number of seats, the cockpit and cabin size, and the altitude all may have an effect on the marketability of a product and the demand for the product.

In some industries, the market may appear saturated at first blush. Nonetheless, companies may still choose to proceed with building and selling a product and competing with competitors in the same space. However, if a company could sell or include a feature in a product that a competitor doesn't already have, it may provide a business advantage to the company.

For all of these situations, it would be beneficial to have an economic system that could provide such analysis to companies.

When performing economic analysis, it is desirable to have a system that allows data to be manipulated such that a user can understand the demand as various variables change. Such information could be very beneficial to companies in all industries, as it would allow a company to utilize its resources in an optimal way, so as to increase the company's revenue.

Economic studies address many variables, including cost, price and quantity. All of these variables only have positive values. That is, in general, the values for the variables used in economic studies always have a value greater than zero. None of these variables have values less than zero.

Accordingly, it would be desirable to have a coordinate system that allowed economic data to be plotted that did not include any negative spaces. This would allow users to manipulate various economic considerations to determine the optimal combination that would yield the best economic advantage.

Figure 1:
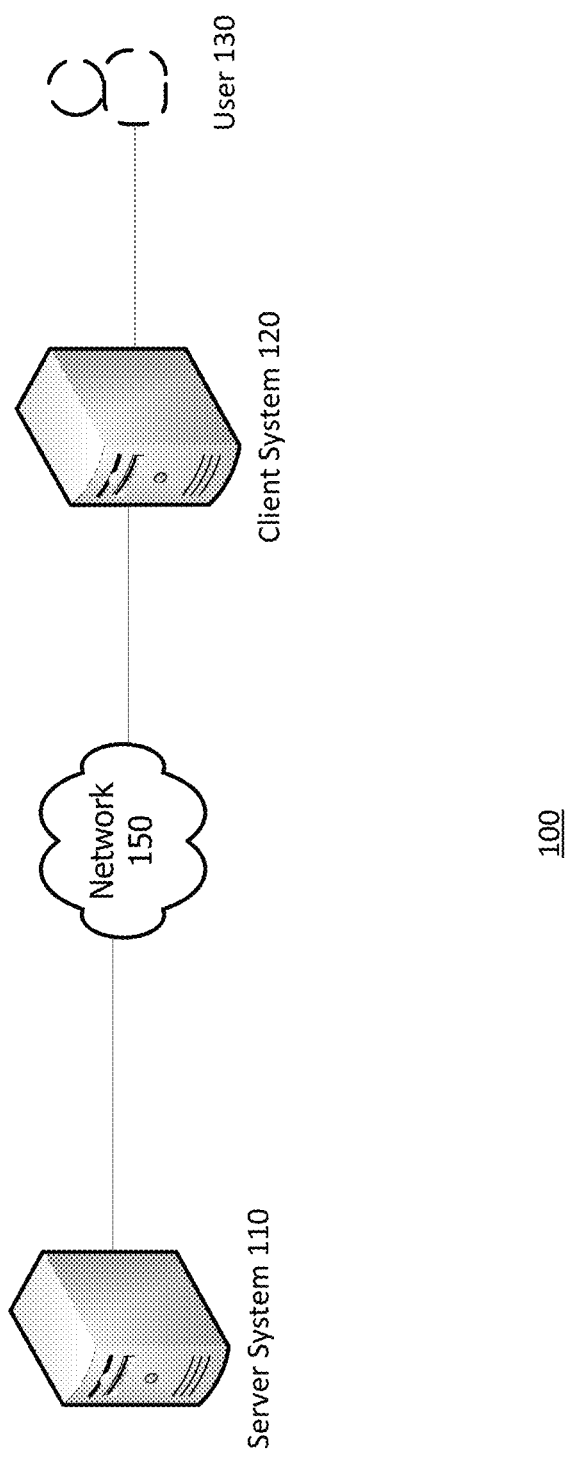
FIG. 1 is a block diagram of an environment for a stepwise regression and plotting system.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

There is disclosed a new type of stepwise regression and plotting system that offers quick regression results that display as 4-dimensional (4D) plots along four non-negative axes. Once data is loaded into the system, users may 1) filter out undesired observations 2) highlight observations, 3) select variables and indicate the 4) primary value, 5) secondary value, 6) vertical (often price) and 7) quantity axes. Once they have selected a variable, the system displays the rank-ordered correlation of the remaining variables against the selected variable. After a user selects a second variable for use, a "sneak-peek" equation describing the relationship between the first variable and the second variable appears, along with the equation's high-level statistics. Users can select additional variables, and the system will not allow selection of variables that are cross-correlated with one another. Users then save equations for later use and analysis.

Users select their saved equations for value analysis. Once they do, up to three graphs display simultaneously, with up to six axes of information about their dataset from which the user drew the analyzed equation. Users can change the axes at any time by right clicking and selecting any numeric category from their database. If any of the axes selected match both the first and second variables, manipulating the data input (via slider bars, or inputting values in the numeric categories or by selecting true or false for "has"/"does not have" variables), the line describing that equation runs through that chart, along with the ordered pair of values (as a "red ball") that the user selected.

Users can also perform demand analysis on the data. Demand planes show the means that users have to buy a product. Users select the quantity (horizontal) and vertical (often price) data elements. Users then can select up to three demand types for analysis—1) aggregate, 2) frontier or 3) average. Users begin with 1) aggregate demand, using the program's algorithms to find a) bin lines, b) total quantities in each bin and c) the average price in each bin. The program will add, subtract or adjust bins until it finds and displays the best possible aggregate demand equation for the data based on the equation's p-value and adjusted $R^2$. With the aggregate demand established, users can request the 2) demand frontier analysis. Here, with respect to the vertical axis, the program will find the outermost point (or points) in each bin and perform regression analysis through these points. The program will derive and show the demand frontier equation coming from this analysis and report the statistics of it. Then users can ask for 3) average demand. Here, the program uses the bins for aggregate demand (which determined average prices) and calculates the average quantities in each bin, performs regression analysis on these average quantity/price points and presents an average demand equation with its statistics.

Once users have selected the 1) primary value, 2) secondary value, 3) price and 4) quantity axes, they can display and manipulate a four dimensional plot of their system.

Description of Apparatus

The apparatus and methods disclosed herein can be applied to any environment depicting opposing forces. Specifically, it can apply to business environments including labor markets, currency and commodity markets, wholesale markets, internet markets, retail markets, military industries, stock markets, and such.

Turning now to FIG. 1, there is shown a block diagram of an environment for the stepwise regression and plotting system. The system 100 includes a network 150, connected to a server system 110, a client system 120 and a user 130. The user 130 accesses the server system 110, a client system 120, and a network 150. The environment 100 may be implemented using distributed computing and interconnected by the network 150. Each of the server system 110 and the client system 120 are computing devices described below with reference to FIG. 2.

The network 150 connects to the server system 110 and the client system 120.

The server system 110 and the client system 120 are each shown as a single computing device. The server system 110 and the client system 120 may actually be a number of interrelated servers and computing resources. The server system 110 and the client system 120 may each include a database server, not shown. In addition, the server system and the client system 120 may each include a web server, also not shown. The database server may be a stand-alone server separate and apart from the web server. The database server and web server may also be made up of a number of physical servers, each logically linked and operating in concert. The database server may contain information related to a client system's license information. In addition, a database server may contain information related to the data that the stepwise regression and plotting system is performed on.

The user 130 accesses the server system 110 using the client system 120 connected to the network 150.

Figure 2:
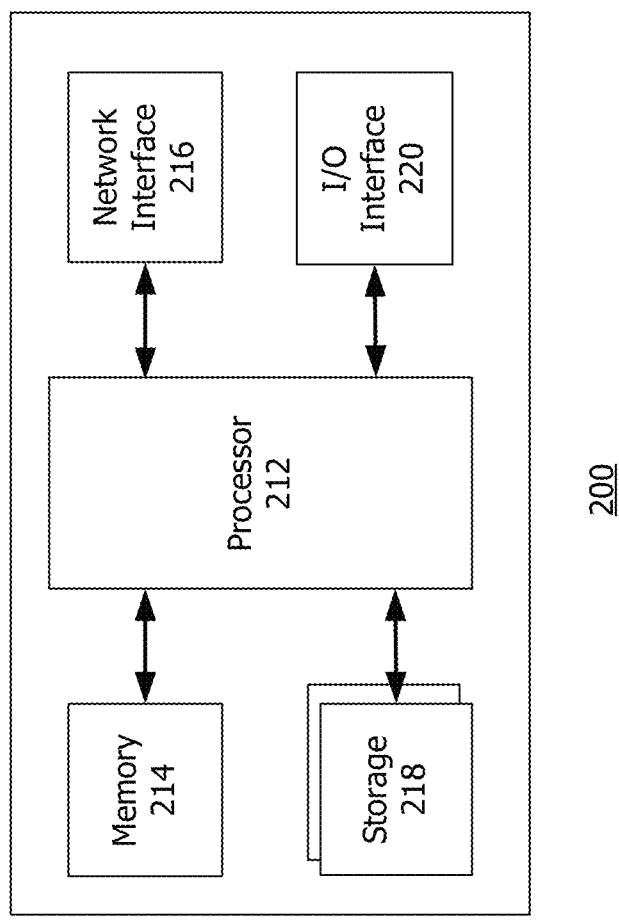
FIG. 2 is a block diagram of a computing device.

Turning now to FIG. 2 there is shown a computing device 200, which is representative of the server systems, such as server system 110 in FIG. 1, client systems, such as client system 120 in FIG. 1, mobile devices and other computing devices discussed herein. Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows®, Symbian, and Apple® Mac® operating systems.

The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by a client computer and others by other devices.

The computing device 200 has a processor 212 coupled to a memory 214, storage 218, a network interface 216 and an I/O interface 220. The processor may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long term storage of data or instructions in the computing device 200. The storage 218 may take the form of a disk, tape, CD, DVD, or other reasonably high capacity addressable or serial storage medium. Multiple storage devices may be provided or available to the computing device 200. Some of these storage devices may be external to the computing device 200, such as network storage or cloud-based storage. The techniques may be implemented with machine readable storage media in a storage device included with or otherwise coupled or attached to a computing device. That is, the software may be stored in electronic, machine readable media. These storage media include, for example, magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The network interface 216 includes an interface to a network such as network 150 (FIG. 1).

The I/O interface 218 interfaces the processor 212 to peripherals (not shown) such as displays, keyboards and USB devices.

Figure 3:
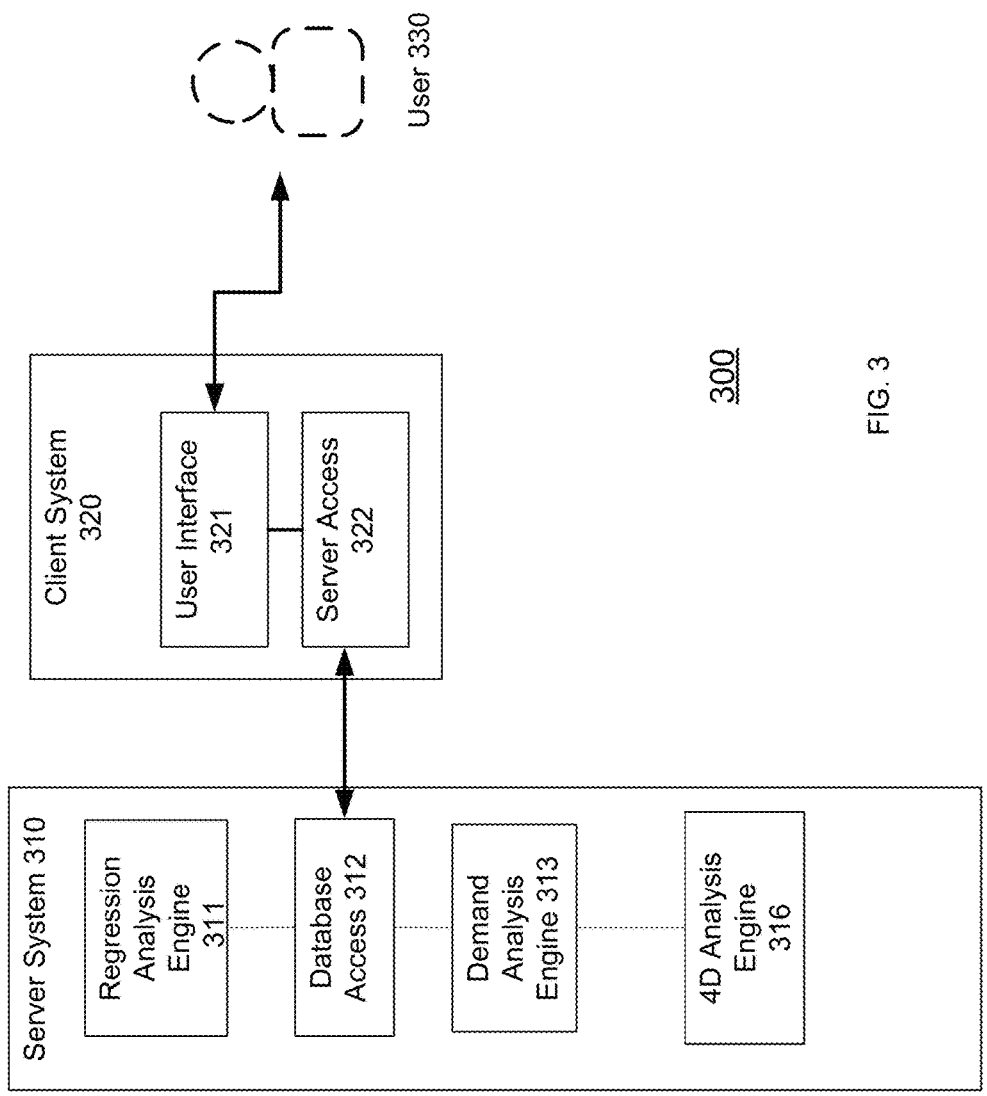
FIG. 3 is a block diagram of a system for a stepwise regression and plotting system.

Referring now to FIG. 3, there is shown a block diagram for a stepwise regression and plotting system. The system 300 includes a server system 310, such as server system 110 in FIG. 1, a client system 320, such as client system 120, and a user 330.

The server system 310 may include a regression analysis engine 311, a database access 312, a demand analysis engine 313, and a 4D analysis engine 316.

Figure 4:
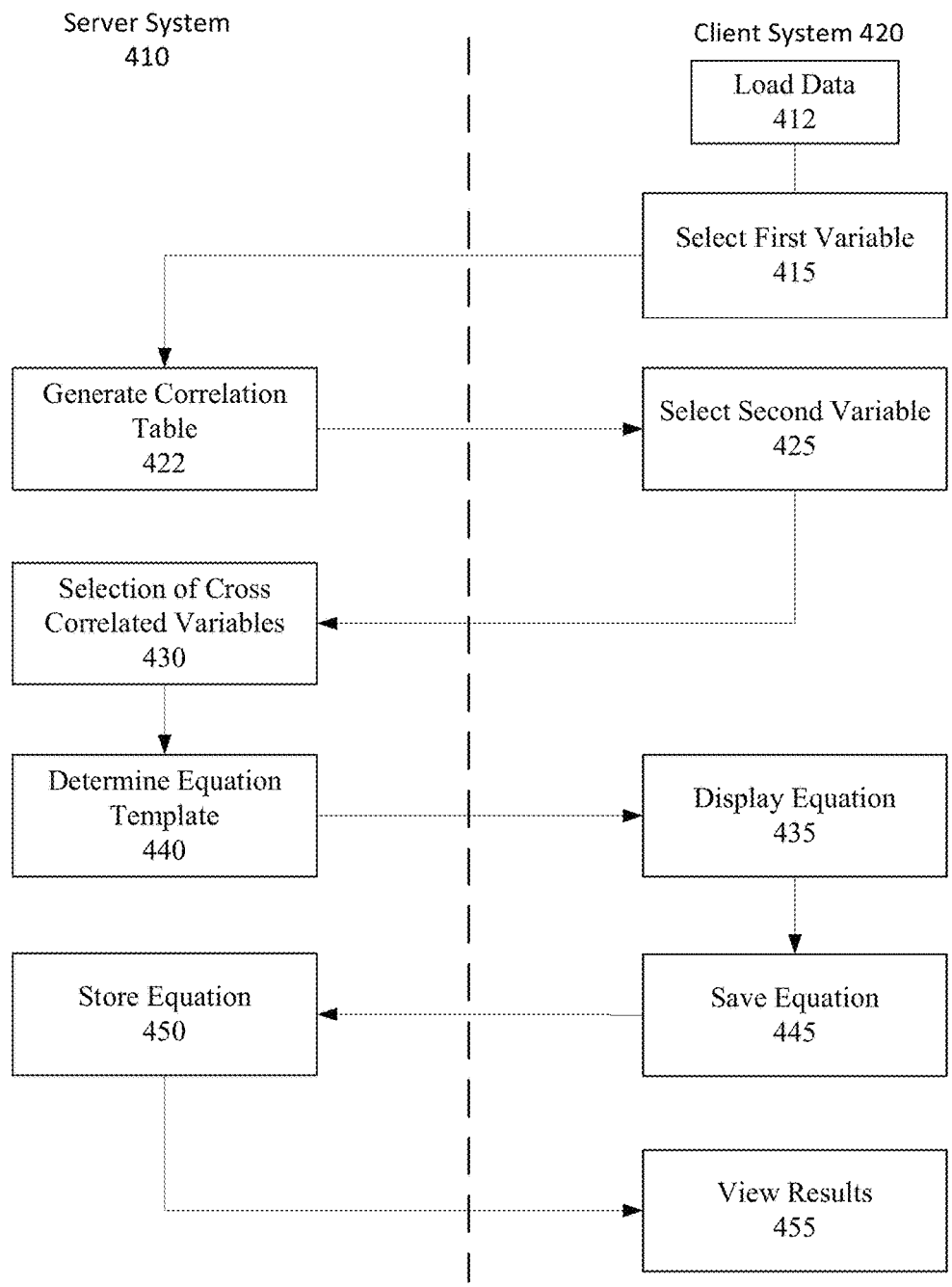
FIG. 4 is a flowchart for a regression analysis engine of the stepwise regression and plotting system.

The regression analysis engine 311 comprises functionality to calculate the regression calculation. The regression analysis engine 311 allows a user, such as user 330, to select a first variable from a set of variables. Once the first variable is selected, the regression analysis engine 311 performs analysis to present the remaining variables in rank order of correlation to the selected first variable, with the quantified correlation displayed. This allows a user to quickly select variables that statistically correlate to the already selected first variable. Further, as additional variables are chosen, the regression analysis engine 311 displays an equation to the user. This equation continues to be created in real-time as the user continues to select additional statistically correlated variables. As a result of the regression analysis engine's 311 ability to provide the user with the variables that statistically correlate to the already selected variable, good variables are rapidly selected and their significance assessed. FIG. 4, which will be discussed subsequently, provides a flowchart of the regression analysis engine 311 functionality.

Figure 5:
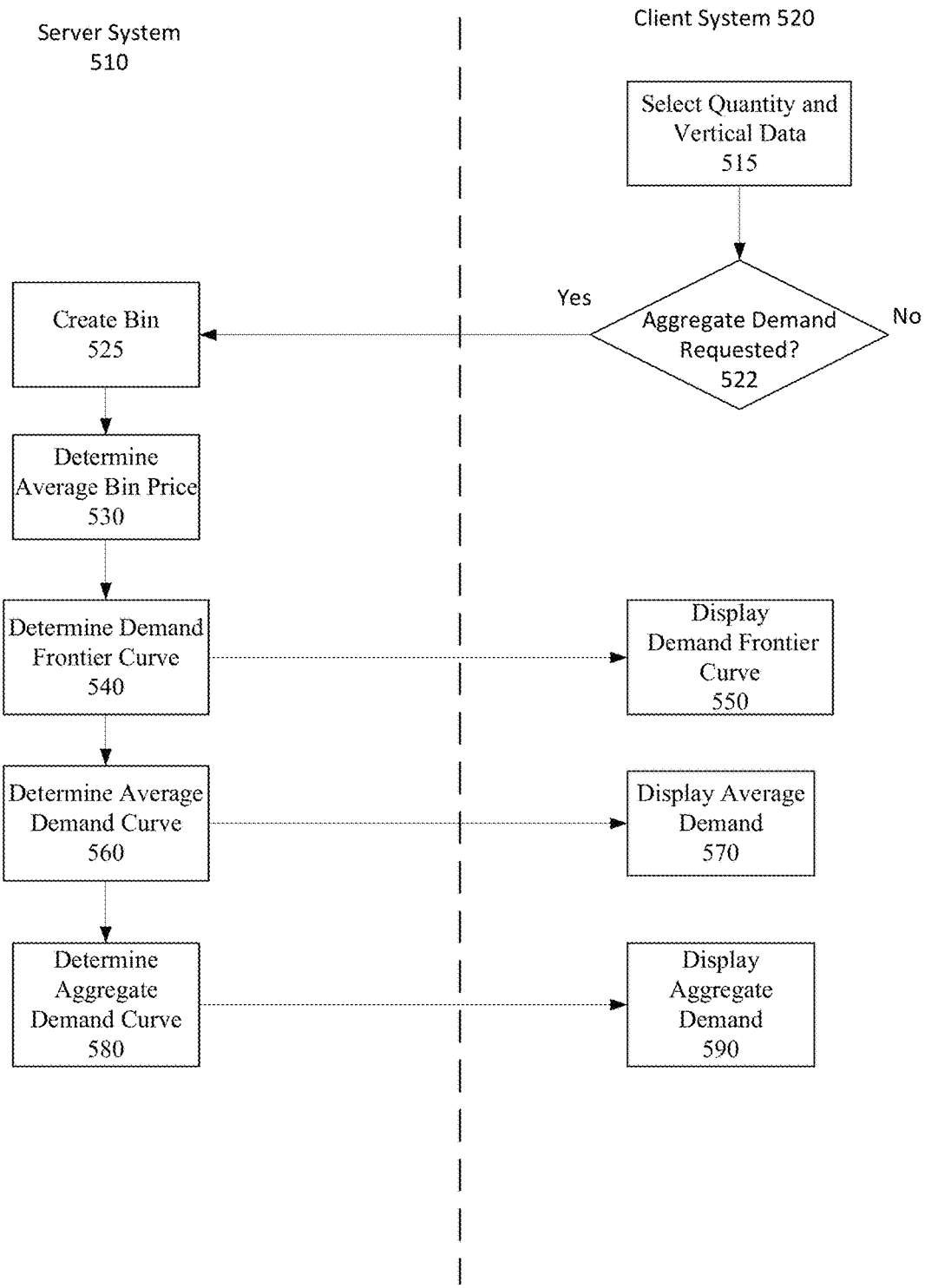
FIG. 5 is a flowchart for a demand analysis engine of the stepwise regression and plotting system.

The demand analysis engine 313 comprises functionality to separate the data intelligently into various bins. A bin is a logical grouping of the data. These bins are aggregated and plotted to form demand curves. FIG. 5, which will be discussed subsequently, provides a flowchart of the demand analysis engine 313 functionality.

The 4D analysis engine 316 comprises functionality that creates a new coordinate system consisting of 4 non-negative dimensions, an origin of (0, 0, 0, 0) and a shared value axis typically measured in units of currency. The shared axis is displayed vertically, the other 3 axes horizontally. This coordinate system is populated with data from regression analyses which form a series of 3 dimensional surfaces. The system intelligently adjusts the scaling for all axes to optimize the display of surfaces for user insight. This may be in either in linear or log-linear coordinate systems. Although automatic, the scaling can also be modified at will by the user. To aid the user in discriminating the various surfaces and constraints, the system leverages color and shading. Although automatically assigned, the user can user can optimize the presentation by adjusting colors, shading and other visual elements at will. The 4D Analysis provides users new insight into market or system interactions and behaviors. Users can further customize the analysis by specifying constraints, or boundaries, that limit the surfaces in any dimension. This paradigm enables users to compare value, cost and their constraints in "value space" as value surfaces. The user simultaneously analyzes demand and recurring costs as demand planes.

The server system may also comprise additional engines, not shown. For example, the server system may comprise a financial CAT scans engine that may comprise functionality that creates a series of 2-dimensional "slices" of the multi-dimensional surfaces. This greatly assists the user to gain a deeper understanding of the behavior of the data system. The slices, or section cuts, are analogous to medical CAT scans, and hence are known as "Financial CAT Scans." The Financial CAT Scan algorithm constrains all but 3 dimensions to constant values. Of three non-constant dimensions, one is incremented by discrete values across its defined range. The remaining two dimensions are evaluated across their entire constrained range. This results in a unique 2-dimensional chart for each discrete value of the incrementing dimension. The process is repeated for all desired combinations of dimensions, yielding a series of 2 dimensional charts for each combination. Users can then analyze these 2D charts to find the best 1D solution(s) to whatever problem is being worked. Thus a Financial CAT scan is a way to resolve a four dimensional problem into a series of 2 dimensional charts that guide one to a one dimensional answer.

In addition, the server system may also comprise an economic trajectory engine that comprises functionality that graphically displays the changes to the data system over the range of another variable, typically time. This effectively forms a 5 dimensional system. The algorithm to create this chart is similar to that employed for Financial CAT Scans, however the presentation is significantly different. Using other techniques (e.g. regression, Financial CAT Scans et al.) a solution is derived for all dimensions except a specific trajectory reference variable, usually time, which is held to some constant value. The solution, a multi-dimensional volume, is then recalculated for incrementing values of the reference variable. The solution volume will typically change shape and location as the reference variable changes. This "movement" of the solution volume is plotted as a series of 2, 3 or 4 dimensional charts and forms the trajectory of the solution volume with respect to the reference. Typical uses for this analysis are to gain insight into how market forces evolve over time. The user may want to predict the near future by extending the trend.

The client system 320 may include a user interface 321 and a server access 322. The user 330 may access the server system 310 through the user interface 321 of the client system 320. The user interface 321 allows a user 330 to interact with the system to perform the stepwise regression analysis.

Description of the Processes

Referring now to FIG. 4, a flowchart for a regression analysis engine, such as regression analysis engine 311 in FIG. 3, is shown. The process 400 is shown implemented on a server system 410, such as server system 110 in FIG. 1, and on a client system 420, such as client system 120 in FIG. 1.

The process begins at 412, wherein a user, such as user 130 in FIG. 1, uses the client system 420 to load data into the system. A user may load the data into the system in various ways, including by manually entering the data into the system, or by loading an Excel file containing the data, or by loading a text-delimited file containing the data. The data provided to the system may include detailed data for a particular industry. For example, if a user wanted to perform regression analysis on the All-Terrain Vehicle (ATV) industry, the data for such an industry likely would include information regarding the make and model of the ATV, the year of the ATV, the price, the warranty information, the number of seats, displacement, torque, the class, and subclass of the ATV. The system can handle data for any number of variables.

After the data is loaded into the system at 412, a user may choose to filter out certain data that is not of concern. For example, in the example for the ATV industry, a user may choose to filter out any data for any ATV's that cost less than $7000.

In addition, a user may also choose to highlight certain data in the results. For example, in the ATV example, a user may choose to highlight the model and the make information.

After the user has selected the data to be highlighted, the process proceeds to 415 where a user may select a first variable, also sometimes known as a dependent variable. For example, in the ATV industry example, a user may be able to choose from at least the following variables: year, price, warranty, seats, displacement and cylinders. After the user selects the first variable, the process proceeds to 422 in which the server system 410 generates the correlation table. The correlation table is a table of the remaining variables shown in rank-order as correlated against the first variable that was selected. In the example of the ATV industry, selecting price as the first variable in 415 may cause the correlation table to order the remaining variables in the following manner: 1) displacement, 2) fuel, 3) weight.

After the server system 410 generates the correlation table at 422, a client system displays the correlation table so that a user can select independent second variable at 425. As the user selects a second variable to correlate against the first variable at 425, the server system then modifies the selection of cross correlated variables at 430. For example, when creating the correlation table, the server system may remove some variables from consideration. The variables that are removed may be variables that do not have numeric values. For example, in the example regarding the ATV industry, variables such as class and subclass may not be included in the correlation table as these are non-numeric variables. In addition, as a user selects a variable, that variable may be removed from the list of variables in the correlation table to choose from. Therefore, the correlation table will continuously be updated as the user selects variables.

As the user is selecting the variables to plot against, the server system determines the equation template at 440 and displays the equation at 435 on the client system. If the user has chosen a linear function, then a linear function will appear in the display and as the user selects independent second variable, the equation will be built and displayed to the user. The user may also choose to analyze the data using a log linear function. In this instance, a log linear function will appear and will build and display the function as the user is selecting the variable. Finally, the user may also choose to analyze the data using a 2nd order polynomial, or any polynomial function. Additional functions may also be used to analyze the data.

After the user has completed selecting the variables and has verified the displayed equation, the user may select to save the equation at 445. When this occurs, the server system stores the equation at 450 in the system's storage. After the equation is stored, the user can choose to view the results at anytime thereafter at 455.

Figure 7:
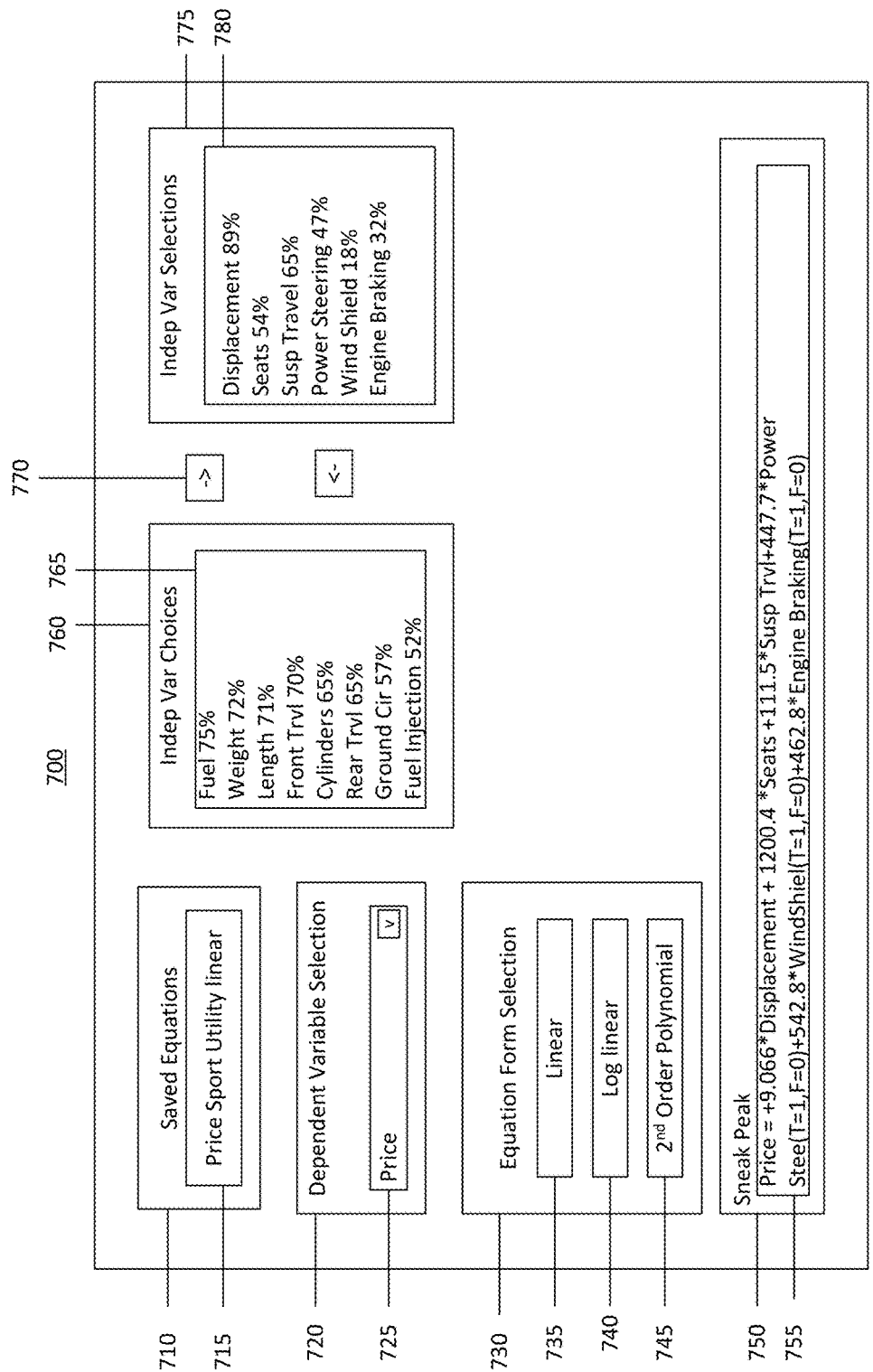
FIG. 7 is an example of a display of the stepwise regression and plotting analysis.

FIG. 7 shows an example 700 of the display of the regression analysis. At 710, the saved equations are shown. In this case, at 715, the equation being used is a linear function using the variables "Price" "Sport" and "Utility."

At 720, the first variable that is selected is shown. In some instances, this first variable may be known as a dependent variable. In this case, at 725, the user has selected "Price" as the first variable.

At 760, the correlation table is shown. At 765, the variables that have not yet been selected are shown in the list, along with their correlation to the first variable. These remaining variables may be known as independent variables in some instances. The correlation table depicted in 760 shows a rank-ordered list of the remaining variables.

As the user selects a variable, the variable will get added to the Independent Variable Selections table shown at 775. As seen in this example, "Displacement", "Seats" and Suspension Travel ("Susp Trvl") are amongst the variables chosen by the user. The symbol at 770 is indicative of an arrow and is used to transfer variables from the correlation table to the "Independent Variable Selections".

At 730, a user can select an equation to analyze the data against. For example, a user can perform the analysis in a linear mode, as seen at 735. In addition, at 740, a user can select a log linear equation to analyze the data against. Finally, at 745, a user can select a 2nd Order Polynomial to analyze the data against. Additional functions, including other polynomial functions, not shown, may also be used to analyze the data. Once the equation has been selected, the user can view the "Sneak Peek" section at 750, to see the equation being created as the user selects various variables. At 755, the equation will be used to analyze the set of values for the selected data.

Referring now to FIG. 5, a flowchart for a demand analysis engine, such as demand analysis engine 312 in FIG. 3, is shown. The process is shown implemented on a server system 510, such as server system 110 in FIG. 1, and on a client system, 520, such as client system 120 in FIG. 1.

The process starts with a user selecting quantity and vertical data at 515. Typically, users select price as the vertical data, but the vertical data is not limited to price. Once the user has selected the quantity and the vertical data, the user may request to see the aggregate demand at 522 for the chosen data.

If the user selects to see the aggregate demand, the server system 510 will create a bin. A bin is a logical grouping of the data. The server system will analyze the data and create bins to logically separate the data. The server system might create the bins by first performing regression analysis to determine a preliminary slope in log-space of the points shown in the demand chart. Once the preliminary slope is created, the bins may be created using empirical data from previous analyses.

Figure 8:
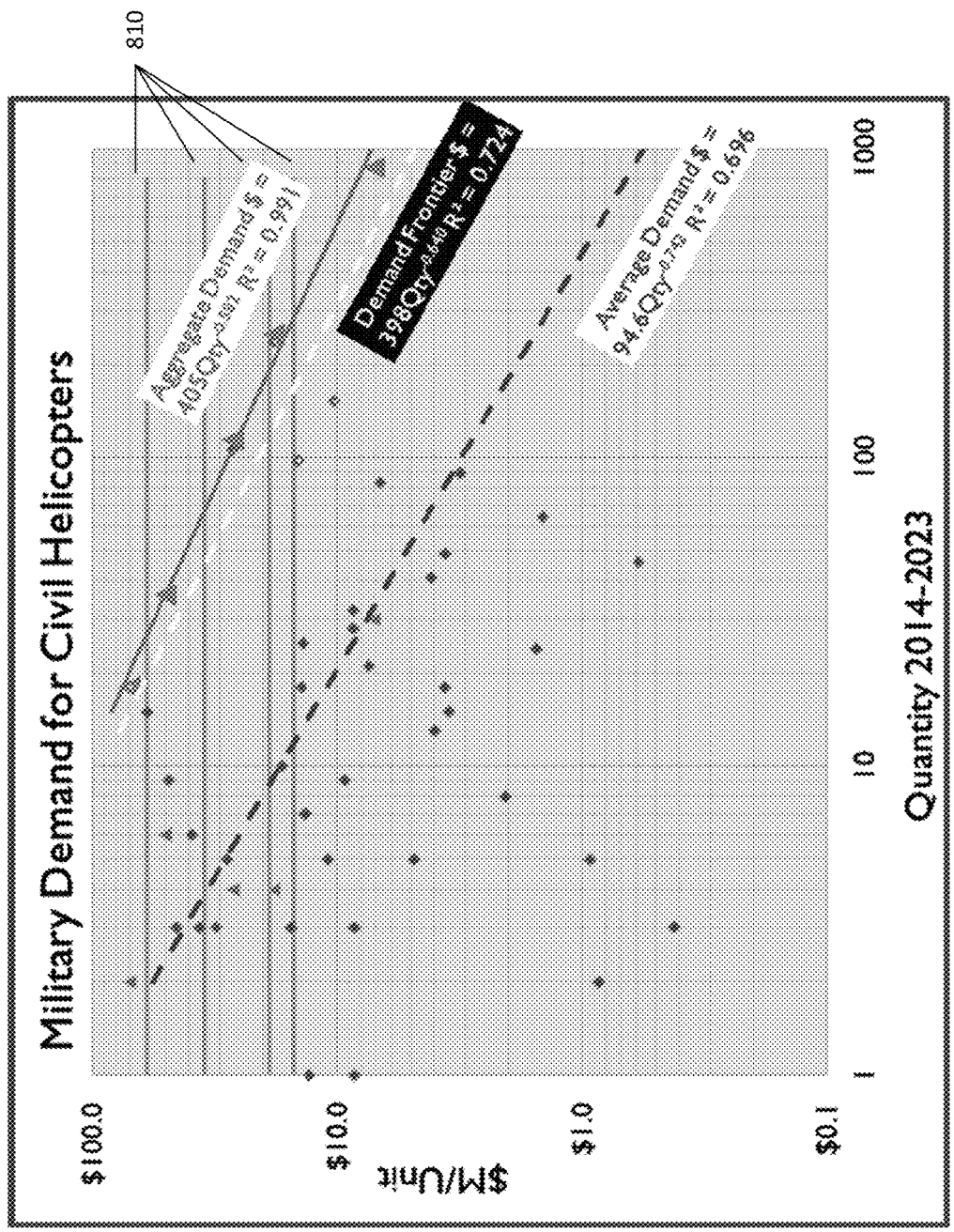
FIG. 8 is an example of a demand chart of the stepwise regression and plotting analysis.

FIG. 8 is an example of a demand chart showing the military demand for civil helicopters. The bins are the four orange horizontal lines at 810 shown dispersed between the $10.0 million to the $100 million range. These bins logically group the data into five different data segments.

Once the bins are created at 525, the server system determines the average bin price at 530. The average bin price is calculated by selecting all the data points in the bin and then taking the average price for all of the data points in the bin.

Once the average bin price is calculated at 530, the server system determines the demand frontier curve at 540. The demand frontier curve is determined by finding the highest quantity in a given price range. Determining the demand frontier is accomplished by "pre-binning" to a number of bins equal to the rounded-up value of the square-root of the number of observations.

After the demand frontier curve is determined at 540, the demand frontier is displayed at 550 on the client system. The equation for the average demand is also determined and displayed.

After the demand frontier curve is determined, the average demand curve is determined at 560. The average demand curve is determined by determining the average points in each of the bins. The average demand curve is displayed at 570 along with the equation for the average demand.

Once the aggregate demand curve is determined at 580, it is displayed to the user at 590. Also shown is the equation for the aggregate demand curve. An ideal value for the aggregate demand curve is 1. In the example in FIG. 8, the aggregate demand curve value is 0.991.

Figure 6:
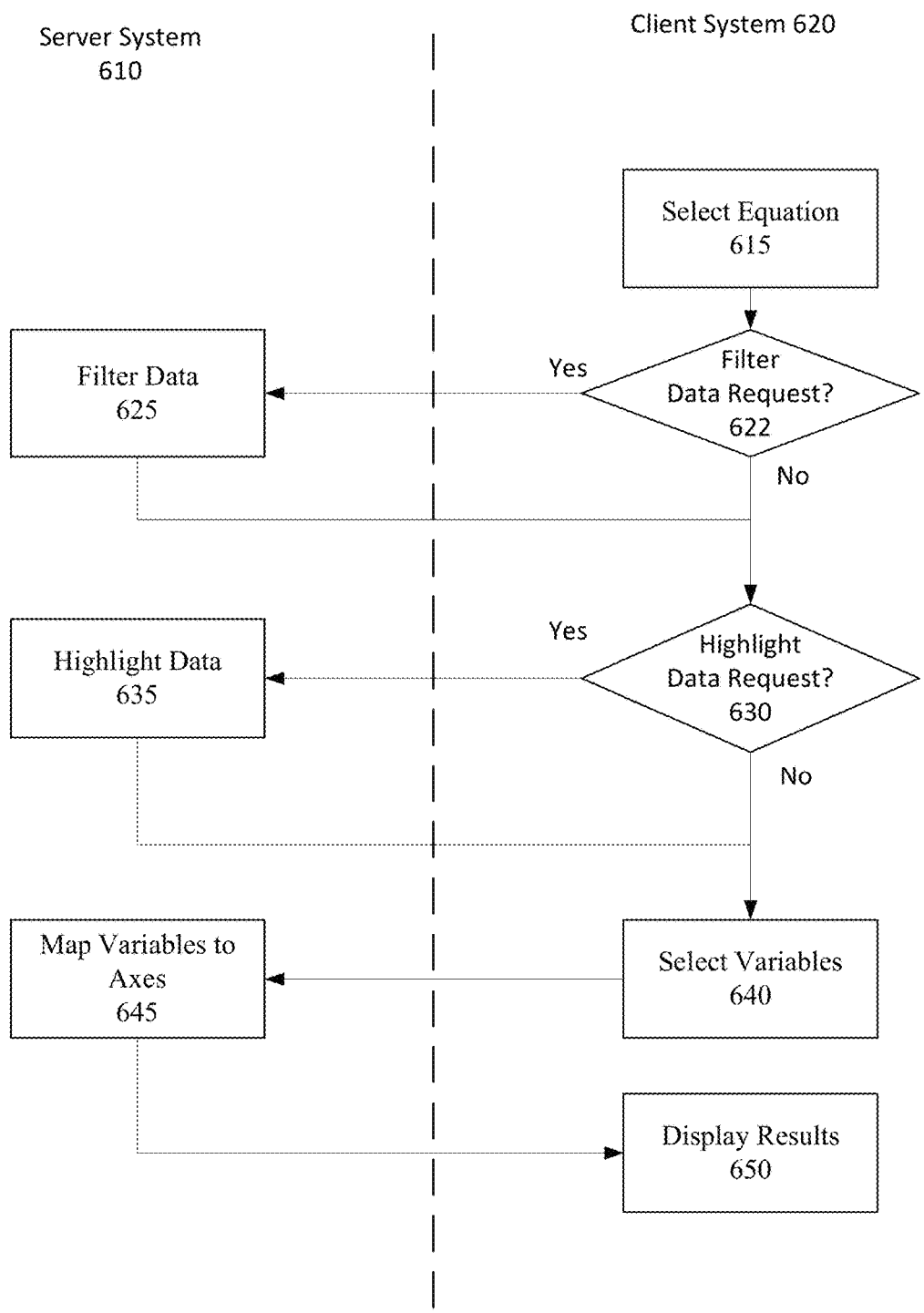
FIG. 6 is a flowchart for a 4D analysis engine of the stepwise regression and plotting system.

Referring now to FIG. 6, a flowchart for a 4D analysis engine, such as 4D analysis engine 316 in FIG. 3, is shown. The process is shown implemented on a server system 610, such as server system 110 in FIG. 1, and on a client system 620, such as client system 120 in FIG. 1.

The process starts with selecting an equation that a user created at 615. For example, when the user was performing the regression analysis as shown in FIG. 4, the user could save the equation that was created. Now, the user can restore that equation and perform the 4D analysis on it.

After the equation is selected at 615, the user can filter some of the data out at 622. For example, if the user does not care to analyze some of the variables (such as cockpit information for aircrafts), then the user can filter that data out. If the user selects some variables, then the server system filters that data out at 625. If the user does not filter any data (No at 622), then the user can select to highlight data at 630. If the user selects data to be highlighted, that that data will appear highlighted in the results. If the user selects data to be highlighted, then the server system 610 highlights the data and marks the data to be highlighted in the database. After the data is highlighted at 635, the user can select variables at 640 for the axes of the coordinate system. As the user is selecting the variables at 640, the server system 610 maps the variables to the axes at 645. While the user is placing their cursor over any of the axes, the user can right-click using a mouse, or similar device, and can select the desired variable for that axes. As the variables are selected, the results are displayed at 650. After the results are displayed, the users may continue to manipulate the data, thereby altering the results and seeing the graphical views change immediately as a result of the manipulation. Users may manipulate the data in numerous ways. For example, users may use slider bars to manipulate the data, or they might enter values into numerically valued variables. In addition, users may use "True" or "False" for turning values on or off.

Figure 9:
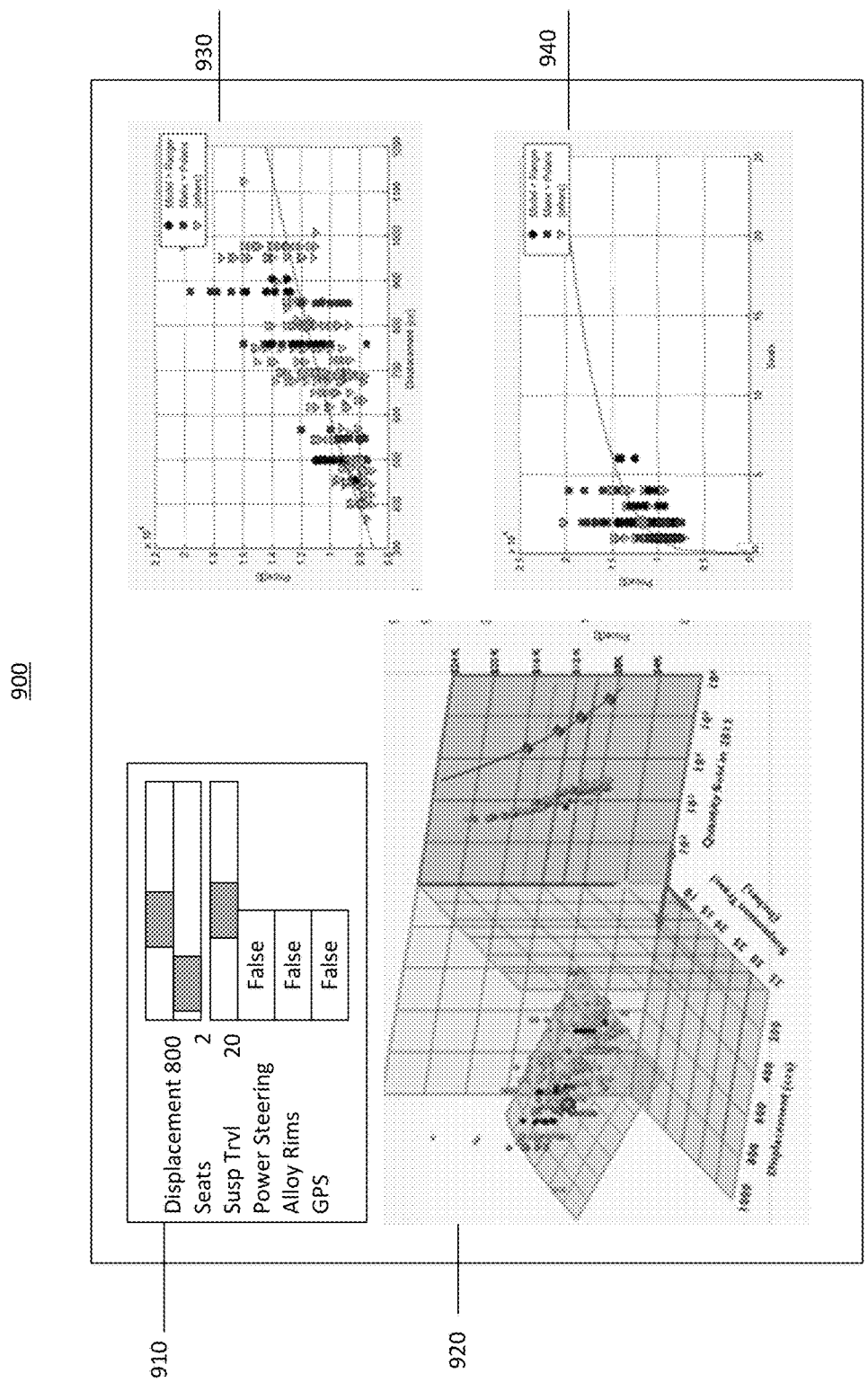
FIG. 9 is an example of a display of 4D analysis graph.
Figure 9A:
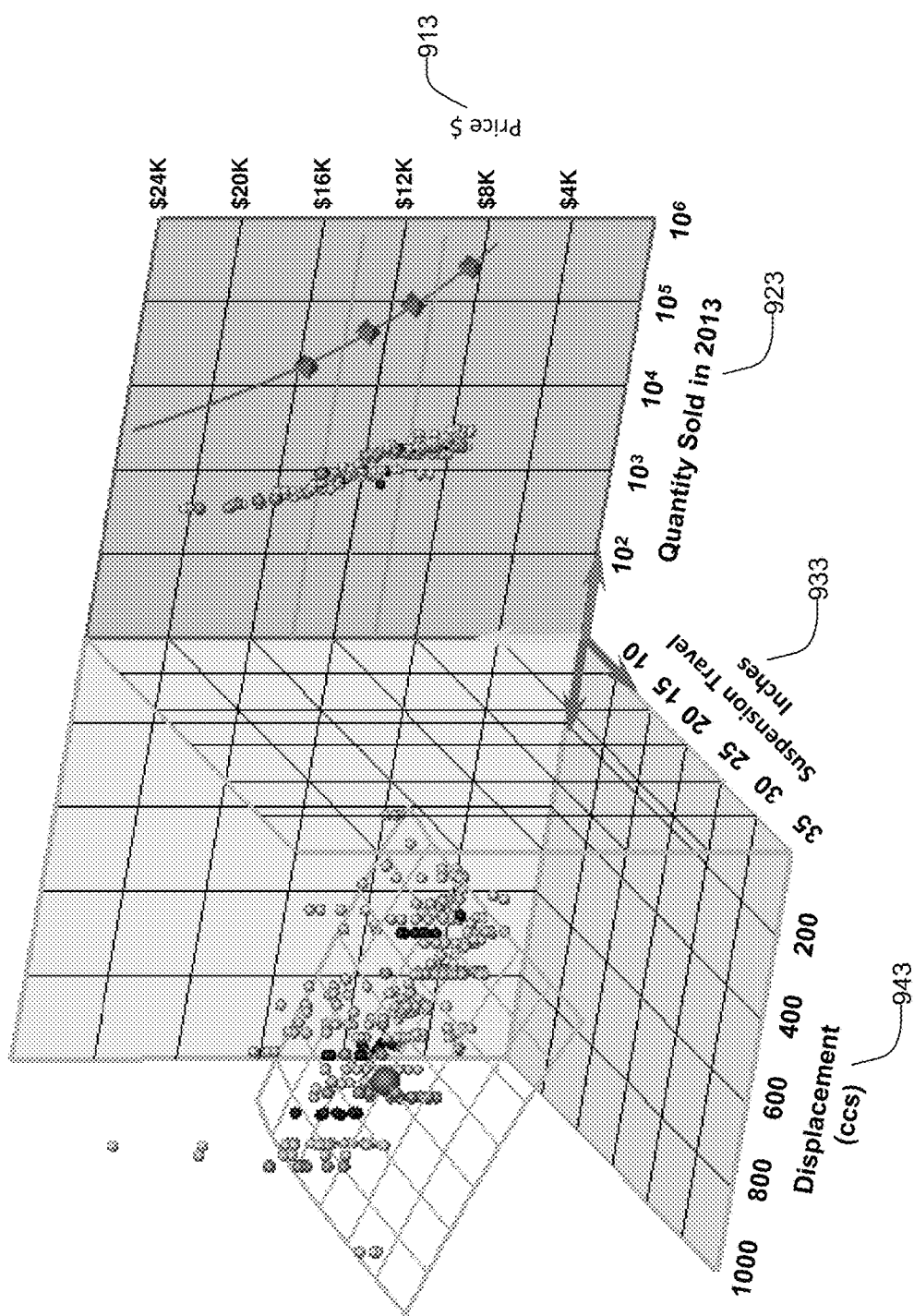
FIG. 9A is an example of a display of a 4D analysis graph.

FIG. 9 is an example of a 4D analysis graph. The 4D graph is seen at 920. The graph shows data for an ATV industry. The vertical axis is the price value. The three horizontal axes are quantity, suspension travel, and displacement. FIG. 9A shows the graph seen at 920 in a larger view. As can be seen in 9A, the graph does not have any negative spaces. Users can use the 4D graph to understand what combination of price, quantity, suspension travel and displacement will yield the best economic results. As seen in FIG. 9A, the vertical axis shows price at 913. The three horizontal axes show Quantity Sold in 2013 at 923, Suspension Travel in Inches at 933 and Displacement (ccs) at 943. The 4D graph in FIG. 9A shows the stepwise regression and plotting analysis for these four variables and what combination will yield that best economic results.

Figure 9B:
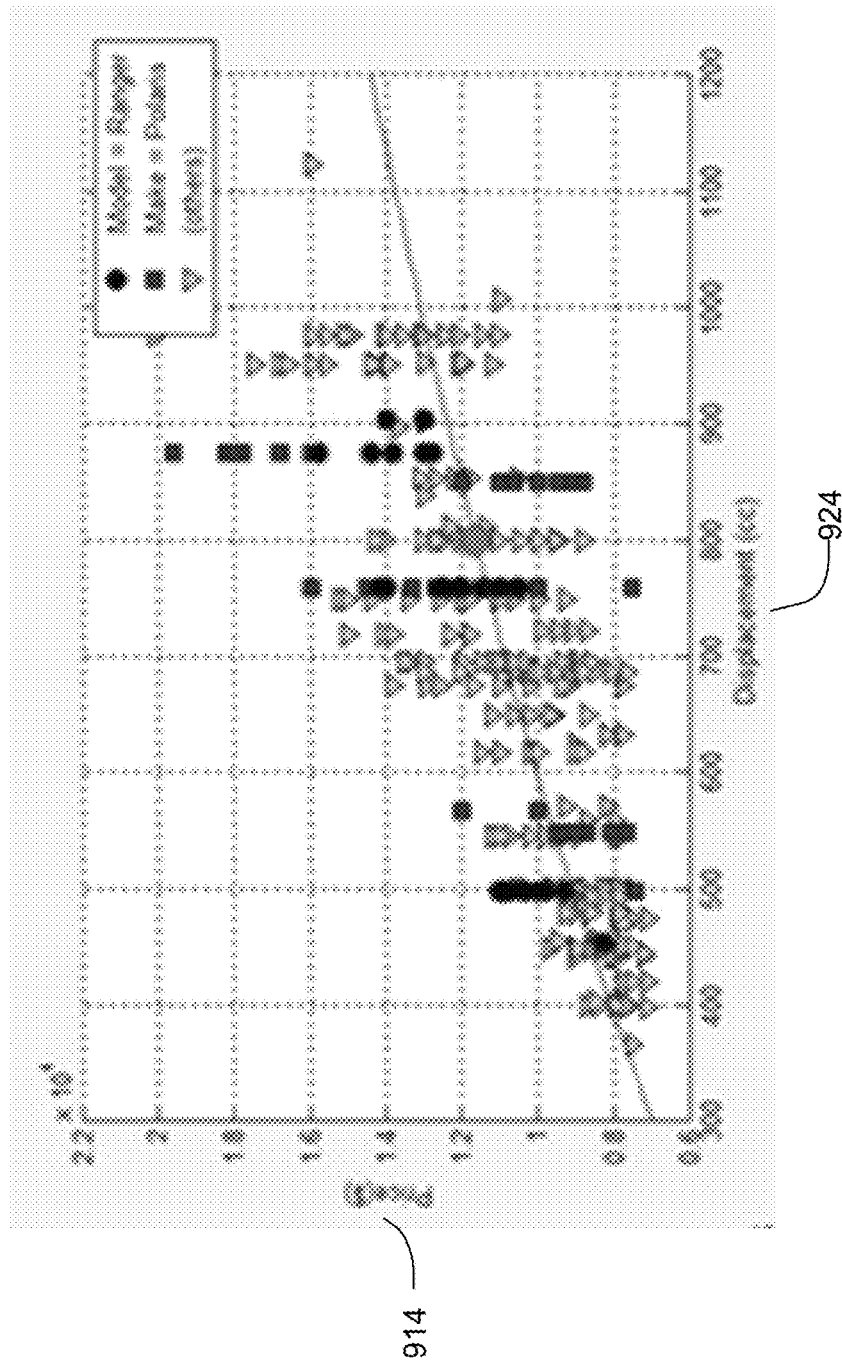
FIG. 9B is an example of a display of a 2D analysis graph.
Figure 9C:
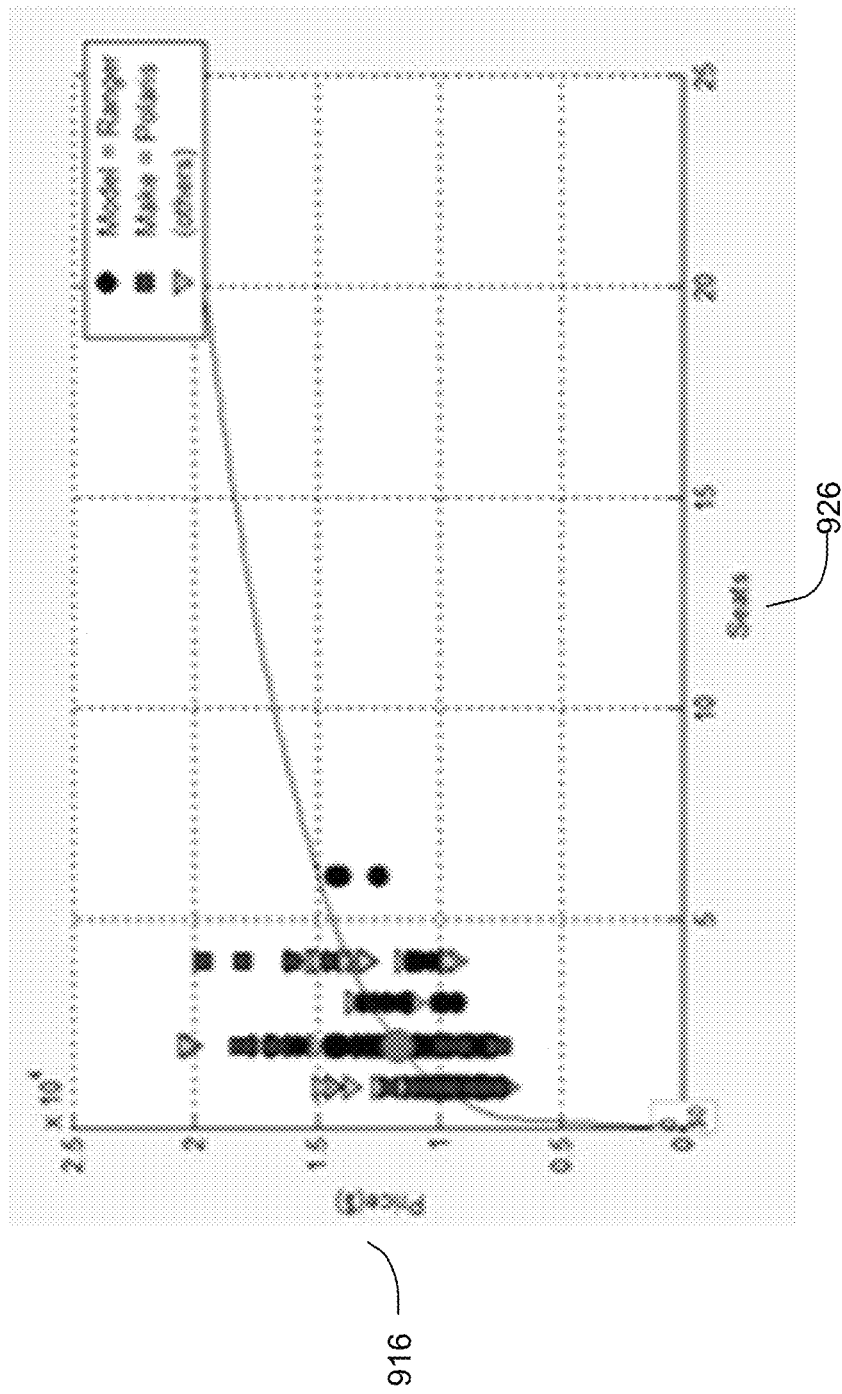
FIG. 9C is an example of a display of a 2D analysis graph.

Returning to FIG. 9, at 910, the variables that can be manipulated are seen. The data in 910 can be manipulated using the slider bars and the "True" and "False" values. As seen in the figure, the variables Displacement, Seats and Suspension Travel all have values, but slider bars exist to increase or decrease those values. In addition, the values Power Steering, Alloy Rims and GPS may have the values True or False. These values also may be manipulated by the user. In addition, the values at 910 may also be manipulated in additional ways. At 930 and 940 are shown the 2D graphs. The first 2D graph 930 shows price and displacement results. FIG. 9B shows a larger view of the 2D graph. As seen in FIG. 9B, the horizontal axis 924 in the graph is Displacement (cc). The vertical axis 914 is price. Therefore, the 2D graph in FIG. 9B shows the combination of price and displacement in the ATV industry that will yield the best economic results. FIG. 9C shows a larger view of the lower 2D graph at 940. As seen in FIG. 9C, the horizontal axis 926 in the graph is Seats. The vertical axis 916 is Price ($). Therefore, the 2D graph in FIG. 9C shows the combination of price and seats in the ATV industry that will yield the best economic results. These 2D graphs may also be useful to a user to allow the user to focus on two variables and see what combination will yield the best economic results.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for efficiently operating a computing device for stepwise regression analysis to identify which of a plurality of features to assign to a type of product displayed in a graphical user interface, the method comprising:
   receiving a set of data which comprises a set of values for demand for each of the features;
   the computing device creating a set of bins in memory, each bin corresponding to one of the features and storing a subset of values of the set of values associated therewith with the one of the features;
   creating the bins comprising:
      performing regression analysis to determine a preliminary slope in log-space of the subsets of values; and
      creating a number of the bins using the preliminary slope and empirical data from previous analyses;
   the computing device creating a demand frontier curve, comprising a curve showing a highest value of the subset of values for each bin of the set of bins;
   the computing device creating an average demand curve, comprising a curve which shows an average value for each of the set of bins and is determined by determining an average value for the subset of values for each bin of the set of bins;
   the computing device displaying the demand frontier curve and the average demand curve as data value points plotted along a vertical axis and three horizontal axes of a four-dimensional (4D) graph; and
   the computing device displaying a dynamically adjustable graphical user interface (GUI) with the 4D graph, independently activating, by a user using a cursor of the GUI, an interactive GUI control element of the GUI corresponding to a selected variable of a plurality of variables from a set of variables, wherein the computing device maps the selected variable to at least one axis of the vertical axis and three horizontal axes of the GUI displayed with the 4D graph in response to the user independently activating the interactive GUI control element corresponding to the selected variable, and independently sliding, by the user, a slider bar element of the GUI corresponding to at least one selected axis of the vertical axis and three horizontal axes of the GUI displayed with the 4D graph, wherein the computing device independently increases and decreases the data value points plotted along the at least one selected axis of the vertical axis and three horizontal axes of the GUI displayed with the 4D graph in response to the user independently sliding the slider bar element corresponding to the at least one selected axis.

2. The method of claim 1, wherein the set of bins are moved after the demand frontier curve is created and causing the demand frontier curve to change after the bins have been changed.

3. The method of claim 1, wherein the type of product comprises one of military helicopters or an all terrain vehicle.

4. The method of claim 1, wherein the type of product is all-terrain vehicles, a first feature of the plurality of features is price, a second feature of the plurality of features is displacement, and a equations for creating the demand frontier curve and the average demand curve are linear equations based on the first and second features.

5. The method of claim 1, wherein the type of product is helicopters, a first feature of the plurality of features is price, a second feature of the plurality of features is quantity, and equations for creating the demand frontier curve and the average demand curve are linear equations based on the first and second features.

6. The method of claim 1, further comprising: the computing device receiving a first user input that selects the one of the features prior to creating the set of bins; the computing device receiving a second user input that selects the creating of the demand frontier curve and a display to the user of the demand frontier curve; and the computing device receiving a third input that selects the creating of the average demand curve and a display to the user of the average demand curve.

7. The method of claim 1, wherein creating the demand frontier curve comprises: creating a number of pre-bins equal to a rounded-up value of a square root of a number of values in the set of values; and storing in each of the pre-bins first subsets of values of the set of values associated with each of the one of the features.

8. The method of claim 1, further comprising: the vertical axis and three horizontal axes forming two dimensional (2D) graphs that are part of the four dimensional (4D) graph.

9. The method of claim 1, further comprising: the GUI having and true/false inputs that can be entered to select which of the subsets of values are referred to by the vertical axis and three horizontal axes; and the slider bar element to be slid back and forth to dynamically increase and decrease where the data value points are plotted along the vertical axis and three horizontal axes.

10. The method of claim 1, the GUI further having true and false value selectors that can each be independently manipulated to immediately and independently turn on or off certain data value points in the 4D graph upon each true and false value selector's independent manipulation.

11. A non-transitory machine readable medium storing a program having instructions which when executed by a processor will cause the processor for stepwise regression analysis to identify which of a plurality of features to assign to a type of product displayed in a graphical user interface, the instructions of the program for:

receiving a set of data which comprises a set of values for demand for each of the features;

the computing device creating a set of bins in memory, each bin corresponding to one of the features and storing a subset of values of the set of values associated with the one of the features;

creating the bins comprising:
performing regression analysis to determine a preliminary slope in log-space of the subsets of values; and
creating a number of the bins using the preliminary slope and empirical data from previous analyses;

the computing device creating a demand frontier curve, comprising a curve showing a highest value of the subset of values for each bin of the set of bins;

the computing device creating an average demand curve, comprising a curve which shows an average value for each of the set of bins and is determined by determining an average value for the subset of values for each bin of the set of bins;

the computing device displaying the demand frontier curve and the average demand curve as data value points plotted along a vertical axis and three horizontal axes of a four-dimensional (4D) graph; and the computing device displaying a dynamically adjustable graphical user interface (GUI) with the 4D graph, independently activating, by a user using a cursor of the GUI, an interactive GUI control element of the GUI corresponding to a selected variable of a plurality of variables from a set of variables, wherein the computing device maps the selected variable to at least one axis of the vertical axis and three horizontal axes of the GUI displayed with the 4D graph in response to the user independently activating the interactive GUI control element corresponding to the selected variable, and independently sliding, by the user, a slider bar element of the GUI corresponding to at least one selected axis of the vertical axis and three horizontal axes of the GUI displayed with the 4D graph, wherein the computing device independently increases and decreases the data value points plotted along the at least one selected axis of the vertical axis and three horizontal axes of the GUI displayed with the 4D graph in response to the user independently sliding the slider bar element corresponding to the at least one selected axis.

12. The non-transitory machine readable medium of claim 11, wherein the set of bins are moved after the demand frontier curve is created and causing the demand frontier curve to change after the bins have been changed.

13. The non-transitory machine readable medium of claim 11, wherein the type of product comprises one of military helicopters or an all terrain vehicle.

14. The non-transitory machine readable medium of claim 11, wherein the type of product is all-terrain vehicles, a first feature of the plurality of features is price, a second feature of the plurality of features is displacement, and equations for creating the demand frontier curve and the average demand curve are linear equations based on the first and second features.

15. The non-transitory machine readable medium of claim 11, wherein the type of product is helicopters, a first feature of the plurality of features is price, a second feature of the plurality of features is quantity, and equations for creating the demand frontier curve and the average demand curve are linear equations based on the first and second features.

16. The non-transitory machine readable medium of claim 11, the instructions of the program further for: the computing device receiving a first user input that selects the one of the features prior to creating the set of bins; the computing device receiving a second user input that selects the creating of the demand frontier curve and a display to the user of the demand frontier curve; and the computing device receiving a third input that selects the creating of the average demand curve and a display to the user of the average demand curve.

17. The non-transitory machine readable medium of claim 11, wherein creating the demand frontier curve comprises: creating a number of pre-bins equal to a rounded-up value of a square root of a number of values in the set of values; and storing in each of the pre-bins first subsets of values of the set of values associated with each of the one of the features.

18. The non-transitory machine readable medium of claim 11, the instructions of the program further for: the vertical axis and three horizontal axes forming two dimensional (2D) graphs that are part of the four dimensional (4D) graph.

19. The non-transitory machine readable medium of claim 11, the instructions of the program further for: the GUI having and true/false inputs that can be entered to select which of the subsets of values are referred to by the vertical axis and three horizontal axes; and the slider bar element to be slid back and forth to dynamically increase and decrease where the data value points are plotted along the vertical axis and three horizontal axes.

20. The non-transitory machine readable medium of claim 11, the GUI further having true and false value selectors that can each be independently manipulated to immediately and independently turn on or off certain data value points in the 4D graph upon each true and false value selectors independent manipulation.

* * * * *